United States Patent [19]

Roussel

[11] Patent Number: 5,295,661
[45] Date of Patent: Mar. 22, 1994

[54] KNIFE VALVE

[75] Inventor: Renald Roussel, Laval, Canada

[73] Assignee: Velan Inc., Montreal, Canada

[21] Appl. No.: 84,466

[22] Filed: Jul. 1, 1993

Related U.S. Application Data

[63] Continuation of Ser. No. 903,125, Jun. 23, 1992, abandoned, which is a continuation-in-part of Ser. No. 668,117, Mar. 12, 1991, abandoned.

[30] Foreign Application Priority Data

Dec. 17, 1990 [CA] Canada .................................. 2032415

[51] Int. Cl.$^5$ .............................................. F16K 3/00
[52] U.S. Cl. ...................... 251/326; 251/204
[58] Field of Search ......................... 251/203, 204, 326

[56] References Cited

U.S. PATENT DOCUMENTS

| | | | |
|---|---|---|---|
| 480,512 | 8/1892 | Prentice et al. | 251/204 |
| 1,995,727 | 3/1935 | Wetherbee | 251/203 X |
| 2,982,513 | 5/1961 | Krummel | 251/203 |
| 3,170,670 | 2/1965 | Johnstone | 251/326 X |
| 3,258,244 | 6/1966 | Hilton | 251/326 X |
| 4,487,393 | 12/1984 | Eagen | 251/195 X |

OTHER PUBLICATIONS

"Velan High Performance Knife Gate Valves", Velan Inc., Canada, pp. 6-11.

Primary Examiner—John C. Fox
Attorney, Agent, or Firm—Samuel Meerkreebs

[57] ABSTRACT

A knife valve comprises a body defining a valve seat and a knife blade longitudinally movable by a cylindrical stem in the body for opening and closing a lateral flow passage defined therethrough. The body includes a bonnet with the stem extending therethrough and with circular packing rings being disposed therein around the stem. The valve seat is located on a first side of the blade and in operative proximity thereto. The stem includes a lower head portion which defines an angular surface, whereas a top portion of the blade defines a slot forming an angular surface parallel to the angular surface of the stem head. The stem head is engageable in the slot with the angular surfaces thereof being in sliding contact. Therefore, when the blade is in its closed position, a longitudinal force exerted by the stem on the blade is transferred into a lateral force oriented towards the seat, thereby forcing the blade against the seat in a tight bidirectional seal under a positive torque. Angular lugs provided on a lower second side of the blade cooperate with tapered lower edges of the blade to also urge the blade against the seat in its closed position. A bypass arrangement is provided in the bonnet around the stem for communication with the valve passage to prevent the pulp fibers from accumulating in the bonnet and jamming the stem. A resilient seat is mounted to the valve body on the first side of the blade.

19 Claims, 4 Drawing Sheets

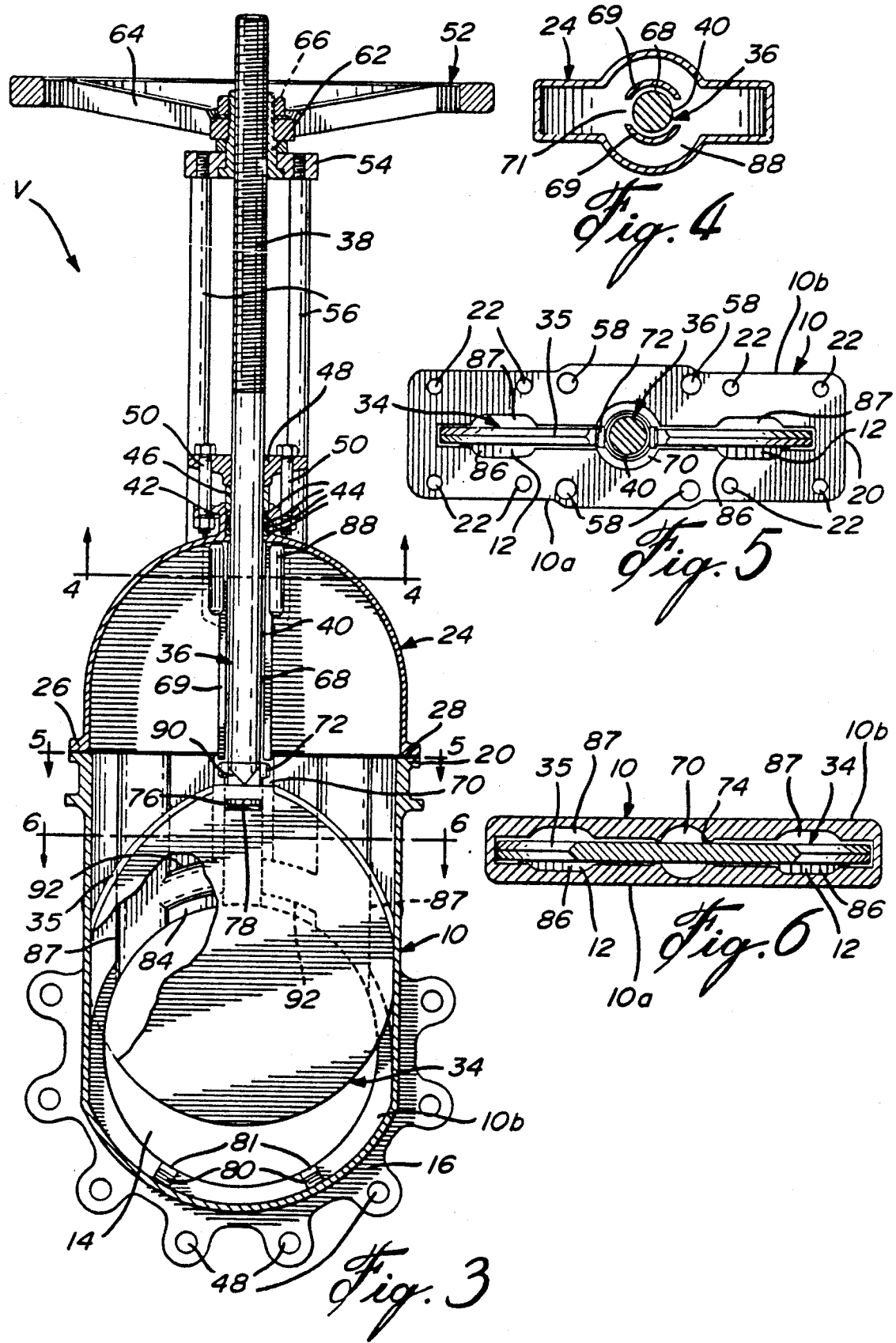

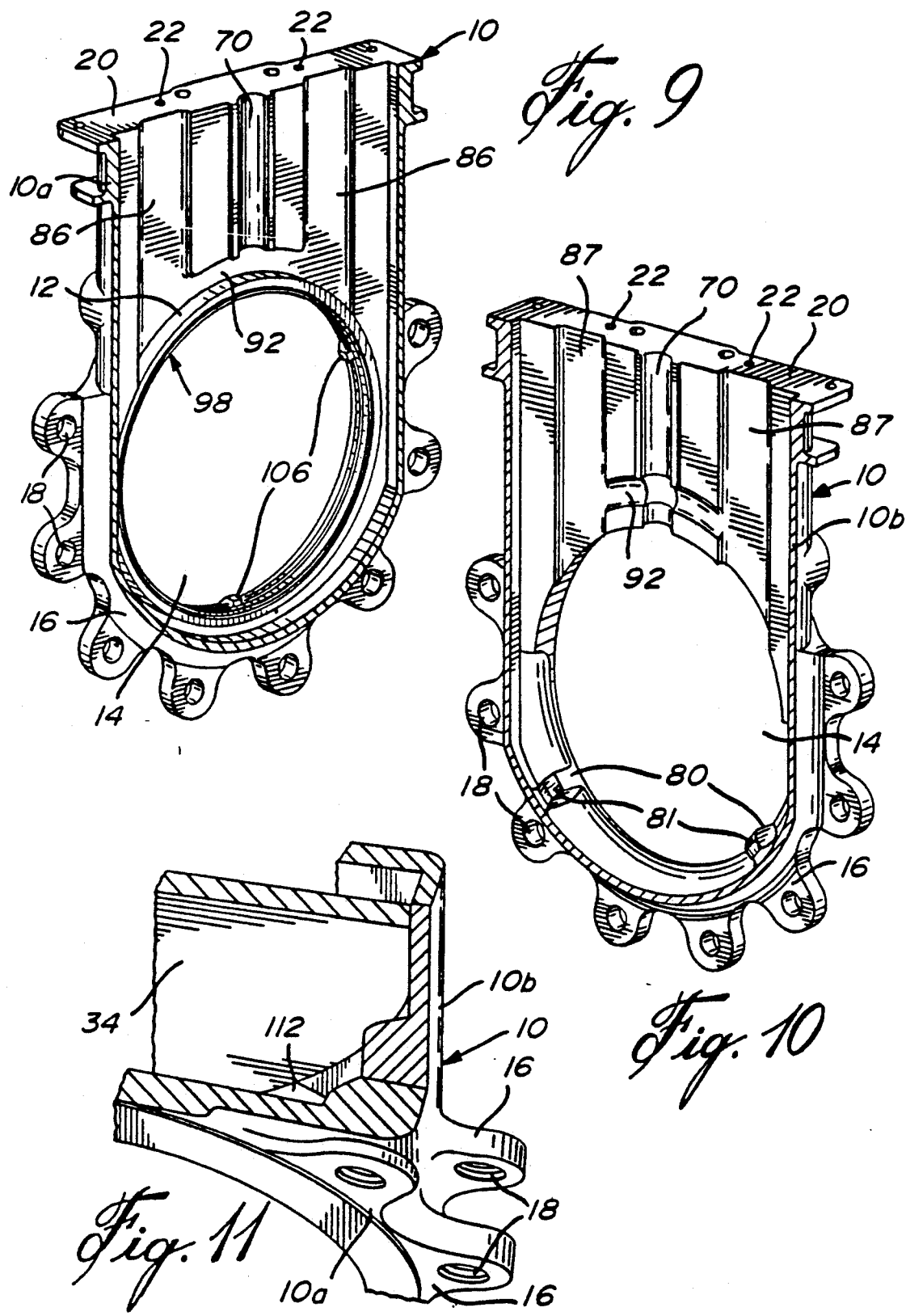

KNIFE VALVE

CROSS-REFERENCE

This application is a continuation of application Ser. No. 07/903,125, filed Jun. 23, 1992, now abandoned, which is a continuation-in-part of U.S. Ser. No. 668,117 filed Mar. 12, 1991, now abandoned.

BACKGROUND OF THE INVENTION

1. Field of the Invention

The present invention relates to knife valves and, more particularly, to a knife valve adapted for use in paper mills.

2. Description of the Prior Art

Knife valves are used, for instance, in paper mills as they are axially short, and thus light and economical since they are made of stainless steel. Furthermore, the valve's knife blade can cut through solids such as pulp contained in the liquid which circulates therethrough.

On the other hand, these knife valves are bonnet-less in order to prevent, for example, the pulp from jamming the valve stem within the bonnet. Therefore, such knife valves require that the knife blade of the valve which moves up and down and thus in and out of the valve body seals the seat of the valve as well as the knife itself. An elliptical packing chamber disposed around the knife blade is used to seal the knife. The surface which has to be sealed is, in such a case, so large that the seal has to be tightened more and more up to a point where the seat scratches the surface of the knife blade after the valve has been opened and closed a large number of times, which results in the valve leaking. Environmentally and down-time wise, such failures are often unacceptable.

Also, in high performance valves, when the frequency of operation is large and especially if there is a requirement for high pressure operations, that is around 150 PSI, and sealing in two directions, the packing chamber rings of the valve become overcharged with the changing load which results in the valve finally leaking through the packing chamber. It is noted that, when a bidirectional seal is required, gate valves cannot be used because they become jammed with pulp.

In the above knife valves, the knife blade must have a very precise finish in order that it does not cut and damage the elliptical packing seal while ensuring the tightness of the seal.

SUMMARY OF THE INVENTION

It is therefore an aim of the present invention to provide an improved knife valve including a bonnet and a standard cylindrical stem seal.

It is also an aim of the present invention to provide a knife valve having a seat which remains tight under high pressure bidirectional operation.

It is still a further aim of the present invention to provide a knife blade having a bypass in its bonnet to prevent materials from accumulating in the bonnet and consequently clogging the same and hampering the operation of the valve.

A construction in accordance with the present invention comprises a knife valve which includes a body having a valve seat and also includes a knife blade longitudinally movable by an operating means in the body for opening and closing a lateral flow passage defined through the body. The valve seat is located on a first side of the knife blade and in operative proximity thereto. A bonnet means is provided for completely enclosing the knife blade in the valve. Means are provided for transferring a longitudinal force exerted by the operating means on the knife blade when the knife blade is in a closed position thereof at least partially into a lateral force oriented towards the first side. Therefore, the knife blade is forced against the valve seat in a tight bidirectional seal.

In a more specific construction in accordance with the present invention, the operating means and the knife blade are slidably engaged one to the other and include a first set of coacting angular surfaces oriented for transferring the longitudinal force into the lateral force.

In a still more specific construction in accordance with the present invention, at least one lug is provided on a lower portion of the body on a second side of the knife blade. A lower portion of the knife blade and the lug define a second set of coacting angular surfaces adapted to urge the knife blade against the valve seat when the knife blade is in the closed position.

In a still more specific construction in accordance with the present invention, the operating means comprises a cylindrical stem having a blade connecting member at a lower end thereof. The blade connecting member includes a neck portion and a head portion extending horizontally at a lower end of the neck portion towards the first side of the knife blade and engaging a slot defined in the knife blade. The head portion and the slot define the first set of coacting surfaces. The neck portion is positioned on the second side of the knife blade and between the knife blade and the body. Therefore, the knife blade is sandwiched between the valve seat on the first side thereof and the blade connecting member and the lug on the second side thereof.

In another specific construction in accordance with the present invention, the operating means comprises a cylindrical stem extending through the bonnet means. Annular sealing means are provided in the bonnet means around the stem to prevent the valve from leaking.

The bonnet means may comprise a stem guide means defining a cavity with the stem being slidable therein. In such a case, a chamber means may be provided around at least a portion of the guide means. The chamber means communicates with the cavity to allow a substance flowing through the valve and within the guide means to access said chamber means and circulate in the bonnet means to prevent solids contained in the substance from accumulating in the guide means of the bonnet means and possibly hampering the operation of the valve.

The guide means may comprise a pair of elongated member of arcuate cross-section and facing each other in a spaced apart relationship to define a pair of blade passages which join the chamber means and the cavity. The chamber means is of substantially annular cross-section and is disposed concentrically around the elongated members.

In another specific construction in accordance with the present invention, the valve seat comprises a resilient seat including an annular ring mounted to the body and including a pair of resilient annular seals for providing seals between the knife blade and the ring and between the ring and the body. In a particular construction, the resilient seals may be torus-shaped.

Another construction in accordance with the present invention comprises a knife valve including a body having a valve seat. The valve also includes a knife blade longitudinally movable by an operating means in the body for opening and closing a lateral flow passage defined through the body. A bonnet means is provided for completely enclosing the knife blade in the valve. The bonnet means comprises a guide means defining a cavity with the operating means being slidable therein. A chamber means is provided around at least a portion of the guide means. The chamber means communicates with the cavity to allow a substance flowing through the valve and within the guide means to access the chamber means and circulate in the bonnet means. This prevents solids contained in the substance from accumulating in the guide means of the bonnet means and possibly hampering the operation of the valve.

BRIEF DESCRIPTION OF THE DRAWINGS

Having thus generally described the nature of the invention, reference will now be made to the accompanying drawings showing by way of illustration a preferred embodiment, and in which:

FIG. 3 is a cross-sectional fragmented front elevation of the knife valve in a partly open position thereof;

FIGS. 4 and 6 are cross-sectional plan views of the knife valve taken respectively along lines 4—4 and 6—6 of FIG. 3;

FIG. 5 is a top plan view taken along lines 5—5 of FIG. 3 of the knife valve without its bonnet;

FIGS. 9 and 10 are perspective views of the seat side and the seatless side of the body of the knife valve, respectively; and FIG. 11 is a fragmented perspective view partly in cross-section of the body of the knife valve.

DESCRIPTION OF THE PREFERRED EMBODIMENTS

Figures 1, 2:
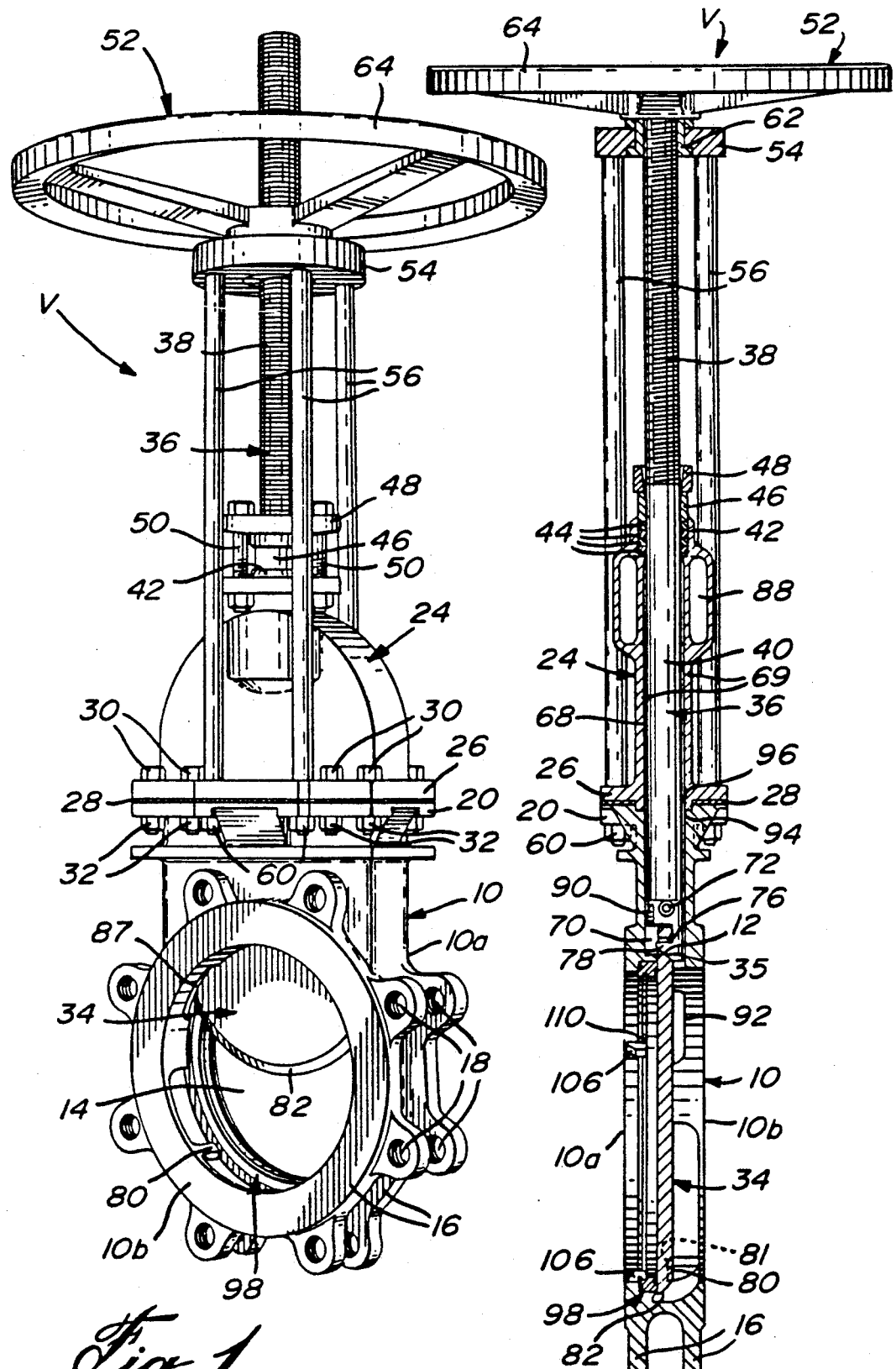
FIG. 1 is a perspective view of a knife valve in accordance with the present invention in a partly open position thereof.
FIG. 2 is a cross-sectional side view of the knife valve shown in FIG. 1 but in a closed position thereof.

FIGS. 1 to 3 illustrate a knife valve V in accordance with the present invention adapted for use in paper mills and comprising a wafer type body 10 which includes body sections 10a and 10b which respectively correspond to the seat side and to the seatless side of the body 10 of the valve V. The body section 10a defines a machined seat face 12 and the assembled body 10 defines a circular passage 14. Each side of the body 10 includes a vertical flange 16 defining a series of threaded holes 18 for bolting the knife valve V between a pair of conduits (not shown) in order that the valve may be used to control the flow therebetween.

An upper portion of the body 10 includes a horizontal flange 20 which defines a series of holes 22. A bonnet 24 which is positioned over the body 10 includes at its lower end a horizontal flange 26 defining a series of holes which are aligned with the holes 22 of the body flange 20 when the bonnet flange 26 is disposed thereover. A sealing gasket 28 is installed between the body flange 20 and the bonnet flange 26. A series of bolts 30 extend through the bonnet flange 26, the gasket 28 and the body flange 20 with nuts 32 being engaged on the bolts 30 to secure with a seal the bonnet 24 to the valve body 10.

A knife blade 34 which is mounted vertically in the valve V for displacement between the valve seat 12 and the bonnet 24 is connected at its upper end to a lower end of a stem 36 which extends upwards through the bonnet 24. The knife blade 34 defines a sharp edge 35 at its upper peripheral portion to cut into any pulp accumulation, as seen in FIG. 3. However, it is noted that this sharp edge 35 is optional and that the valve V may function very well without it.

The stem 36 includes adjoining upper and lower portions 38 and 40 which are respectively threaded and smooth. The threaded portion 38 of the stem 36 is at least as long as the travel of the knife blade 34. An upper portion 42 of the bonnet 24 defines a circular chamber into which are installed a series of vertically stacked annular packing rings 44 which are compressed by a gland bushing 46 loaded and held in place by a loading flange 48. A bolt and nut arrangement 50 secure the loading flange 48 to the upper portion 42 of the bonnet 24.

A handle assembly generally indicated by the numeral 52 includes a mounting bracket 54 into which are threadingly engaged the upper ends of four mounting rods 56 which extend downwards therefrom and through holes 58 defined in the bonnet flange 26, the gasket 28 and the body flange 20 with the rods 56 being secured at their lower ends by nuts 60. A bushing 62 which is journaled in the mounting bracket 54 defines a threaded cavity which engages the threaded upper portion 38 of the stem 36. A wheel handle 64 which includes a central opening is fitted around an upper portion of the bushing 62 with a key 66 being provided in order that a rotation of the wheel handle 64 causes the bushing 62 to rotate in a horizontal plane within the mounting brackets 54 thereby resulting in a vertical linear displacement of the stem 36 and thus of the knife blade 34 within the valve body 10 and the bonnet 24.

The stem 36 slides inside a circular cavity 68 defined in the bonnet 24 by a pair of stem guides 69, as seen in FIGS. 2 to 4. The body 10, lower than the bonnet, also forms a stem guide defined by a cavity 70. Each stem guide 69 includes a vertical elongated member of arcuate cross-section, with both stem guides 69 facing each other and being separated by a passage 71. The stem 36 is prevented from rotating by a pin 72 sliding in a vertical slot 74 defined in the body 10 and in between the stem guides 69. The passage 71 between the stem guides 69 and the body slot 74 can also slidably accommodate the knife blade 34 (see FIGS. 3 to 6).

Figure 8:
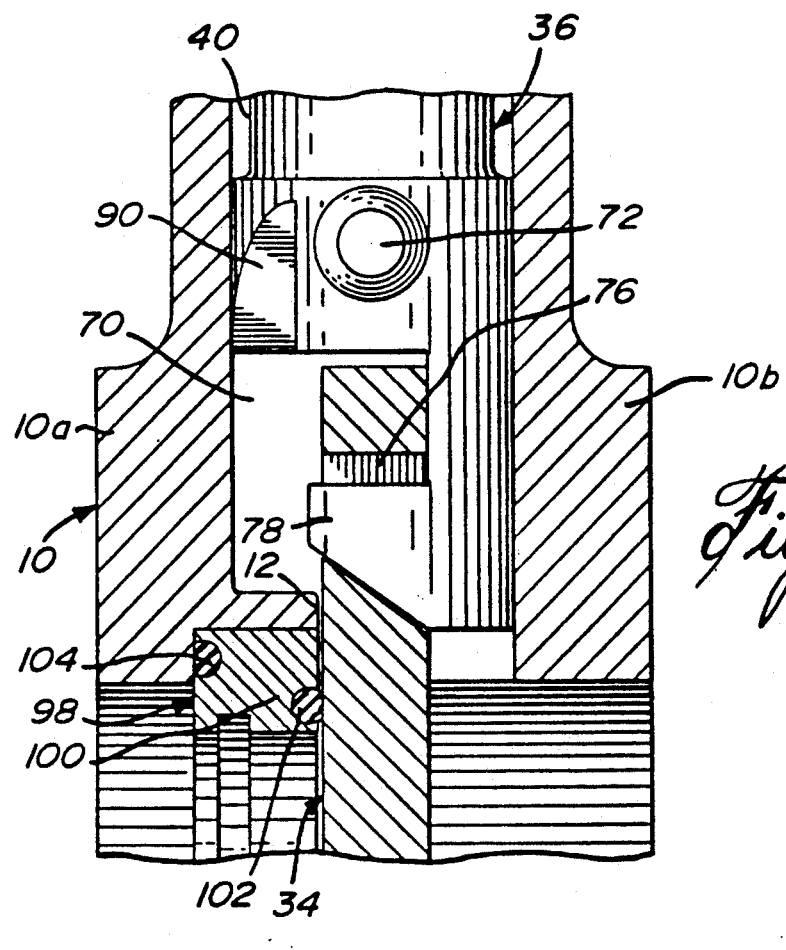
FIG. 8 is an enlarged cross-sectional side view of the connection of the valve stem and knife of FIG. 2.

As best seen in FIG. 8, an angular tapered slot 76 which is defined in the upper portion of the knife blade 34 slidably receives a tapered head 78 extending horizontally from the lower end portion of the stem 36. Bottom lugs 80 which each define an upwardly and inwardly beveled surface 81 are formed in a lower portion of the valve body 10 on a same side of the knife blade 34 as the tapered stem head 78, this side being the seatless side of the body 10 of the valve V. The knife blade 34 defines a sharp beveled lower edge 82 which is substantially parallel to the angular surfaces 81 of the bottom lugs 80. Therefore, when the stem 36 and thus the knife blade 34 are caused to displace downwards, the knife beveled edge 82 contacts the bottom lugs 80 at their angular surfaces 81, at which point a further downwards vertical force acting on the stem 36 by way of the handle assembly 52 is transferred in a horizontal force, as a result of the coacting angular surfaces of the tapered slot and head 76 and 78, respectively, which can be parallel but which are shown with a 1° angular offset to reduce the friction forces between these coacting sliding surfaces. Both the stem tapered head 76 and the beveled body lugs 80 thus force the knife blade 34 laterally against the seat face 12 (and, more particularly, against a soft seat disposed on the seat face 12, such a soft seat being described hereinbelow). When the valve V is closed, this sealing contact is maintained by the stem force.

In normal conditions, the flow (from right to left in FIGS. 2, 7 and 8) forces the knife blade 34 against the seat face 12. When the flow is reversed, the knife blade 34 is held in place by the bottom lugs 80 and by the stem head 78 and the angular surfaces of the tapered stem head 78 and slot 76. This construction provides a high-pressure bidirectional seal.

Guides 84 ensure the proper alignment of the knife blade 34 when it travels between the open and closed positions thereof, as seen in FIG. 3.

Referring now to FIGS. 3 to 6, the internal configuration of the valve body 10 is designed so that pulp fibers are prevented from collecting therein. The white water which contains the pulp fibers travels in the pipes located upstream and downstream of the valve V with a swirling motion. The pulp flowing through the valve body 10 is directed through wide passages 86 and 87 defined in body sections 10a and 10b respectively, and into the bonnet 24. In view of the above swirling motion, the pulp fibers enter the bonnet 24 on one side thereof, that is mainly along only one of the two sets of facing wide passages 86 and 87. Since the movement of the pulp in the bonnet 24 is almost completely blocked by the stem 36, the side of the bonnet 24 receiving the pulp fibers will become completely jammed, even before the fibers become dry. Therefore, it is necessary to define a bypass in the bonnet 24 and around the stem 36 to allow the pulp fibers to reach the other side of the bonnet 24 in a relatively unimpeded motion. Once the pulp reaches this other side of the bonnet 24 it returns to the passage 14 through the other set of facing wide passages 86 and 87, whereby the pulp fibers follow a substantially uninterrupted swirling motion through the valve V. The bypass is made of an annular cavity 88 defined at the top of the bonnet 24 concentrically around the stem guides 69 to ensure a good circulation of the pulp fibers outside of the circular cavity 68 in the bonnet 24, instead of clogging the bonnet 24 and the stem 36 at the circular cavity 68.

As seen in FIGS. 2 and 3, an edge 90 is defined on one side of the stem head 78 to provide additional cleaning of the stem cavities 68 and 70 as it cuts through the pulp fibers. A further passage 92 is also defined in the valve body 10 to further ensure the proper flow of the pulp.

It is noted that a recess 94 (see FIG. 2) defined in the top surface of the valve body 10 is adapted to receive a shoulder 96 formed at the lower end of the bonnet 24 thereby allowing the body 10 and the bonnet 24 to be perfectly aligned when they are mounted together.

Figure 7:
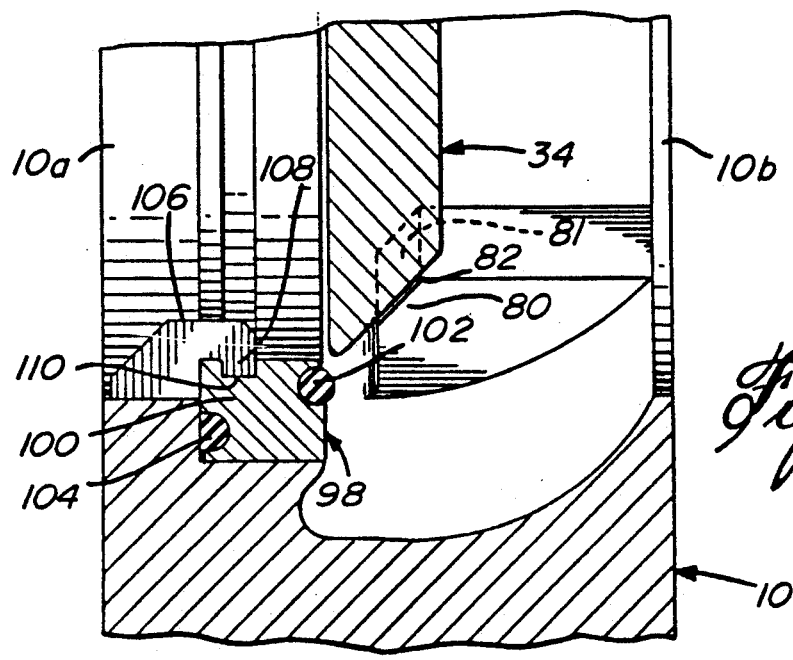
FIG. 7 is an enlarged cross-sectional side view of a resilient seat of the knife valve of FIG. 2 but with the valve being shown in a slightly open position thereof.

Now referring to FIGS. 7 and 8, an annular soft seat 98 may also be installed in the valve body 10 within the seat face 12. This resilient seat 98 consists of a ring 100 having a swaged front seal ring 102 which provides, in the closed position of the knife valve V, the seal between the resilient seat 98 and the knife blade 34. A rear seal ring 104 ensures the seal between the ring 100 and the valve body 10. The resilient seat 98 is secured to the valve body 10 by three clips 106 welded equidistantly thereon. Each clip 106 includes a L-shaped finger 108 which engages an annular recess 110 defined in the ring 100.

As well seen in FIGS. 2, 5, 6 and 9, when the valve V is in its closed position, the passages 86 on the seat side of the valve V are closed at their lower ends by the seat face 12 thereby ensuring the tightness of the valve V. Indeed, the seat face 12 closes the passages 86 to prevent fluid communication between the pipe on the seat side of the valve V and the passages 86, and thus the bonnet 24 and the pipe located on the seatless side of the valve V. If the flow is from left to right on FIG. 2, the seat face 12 closes the access to the passages 86 and thus to the bonnet 24 and to the other side of the valve V, whereas, if the flow is from right to left, the fluid will fill the passages 87, the bonnet 24 and the passages 86, at which point it is denied access to the seat side of the valve V by the seat face 12.

As seen in FIG. 11, an opening 112 becomes defined above the seat face 12 when the blade 34 is completely raised (when the valve V is in its opened position) to allow fluid to access the passages 86 as they are mainly hidden between the body section 10a and the blade 34, and to provide communication between the facing sets of passages 86 and 87 provided on both sides of the blade 34.

In the present invention, the knife blade 34 is free to fully contact the seat face 12 of the valve body 10. The presence of the bonnet allow for the angular engagement of the stem head 78 in the knife tapered slot 76 which results in a positive torque induced closure of the knife blade 34. The force applied on the stem 36 provides a positive load on the knife blade 34. The angular engagement of the stem head 78 and the gate blade 34 further results in a bidirectional seat tightness.

Furthermore, the installation of the bonnet 24 and the standard cylindrical stem seal or packing rings 44 instead of the oval packing found normally around the blades of knife valves ensures that there is no leakage through the stem packing. Therefore, the sealing of the valve is not achieved by a packing around the knife but by a packing on the valve stem which is rendered possible by the provision of the bonnet and the ensuing result that the knife is completely inside the valve. Also, the smaller circular stem packing results in a reduced required thrust to operate the knife valve while ensuring a perfect tightness thereof.

Finally, the special body and bonnet inside geometry of the present knife valve V provides a continuous flushing of the valve for preventing pulp accumulation therein. Indeed, the bypass arrangement, which is mainly characterized by the bonnet cavity 88 providing communication between both sides of the bonnet 24 to bypass the stem 36, prevents the wooden chips from accumulating within the stem guides 69 which could hamper the operation of the valve V and even cause the same to fail.

From the above, it is easily understood that two new concepts have been incorporated in a knife valve to provide an ideal valve for use, for instance, in paper mills. First, the use of a bonnet is now possible when solids are present in the liquid flowing through the knife valve due to the above described bypass arrangement provided in the bonnet. In this case, a positive torque induced closure of the knife blade, such as with the structure described before, is optional depending on whether or not, for example, a bidirectional seal is required.

Second, a high-pressure bidirectional tight knife valve is provided by the positive torque induced closure of the knife blade, as described hereinbefore. In this latter case, a bonnet is provided with or without a bypass, depending on whether or not solids are present in the liquid flowing through the knife valve.

The combination of the bonnet, the bypass and the positive torque induced closure of the knife blade results in a knife valve well adapted for use in paper mill applications necessitating a high pressure bidirectional seal.

It is also easily seen that various other structures could be devised as equivalents to the proposed illustrated bypass arrangement and positive torque induced blade closure arrangement. For example, a ramp could be defined directly onto the valve body at the top of the valve opening to deflect laterally the stem head and thus the upper portion of the knife blade tightly against the valve seat, with the stem head being laterally displaceable with respect to the stem. In such a case, the stem head could be fixedly secured to the knife blade.

The above features result in a knife valve having a long cycle life without any leakage, even under high pressure bidirectional flow.

Regarding the bypass feature of the valve, it is noted that the present valve finds its principle use in installations where white water is circulated through the pipes. White water normally includes approximately 1% of solids, but it is noted that the present valve has been tested for white water containing 7 to 8% of solids. As the fluid circulates through the pipes and the valve passage 14, it displaces in a whirl. The fluid can move up the circular cavity 66 of the bonnet 24, whereby without the passages 71 the stem 36 could become jammed with solids within the stem guides 69. With these passages 71, the fluid can enter the bonnet whereby it becomes necessary to allow the bonnet 24 to be flushed in order to prevent a clogging of the bonnet itself. For that purpose, the wide passages 86 and 87 provide a communication between the bonnet 24 and the valve opening or passage 14. There must be provided a set of facing wide passages 86 and 87 on each side of the stem 36, as best seen in FIGS. 5, 6, 9 and 10, in view of the whirling motion of the fluid. Indeed, the swirling fluid will, asides from entering the stem cavity 68, flow upwards in one of the sets of facing passages 86 and 87. With the provision of the annular bypass cavity 88, the fluid in one side of the bonnet will flow to the other side of the bonnet and be forced out thereof through the other set of wide passages 86 and 87.

Tests have shown that, without the bypass cavity 88, one side of the bonnet 24 becomes completely clogged with solids due to the entering of the pulp fiber fluid by way of the first set of facing passages 86 and 87 into the bonnet 24 as a result of the whirling motion of the fluid in the pipes. With the present arrangement, the fluid can then be flushed out of the bonnet 24 through the other set of facing wide passages 86 and 87 which is located on the other side of the stem 36. Accordingly, the combination of the wide passages 86 and 87, the bonnet 24 and the bypass 88 allow the fluid to continuously flow through the valve V, with the dimension of these elements being such as to allow fluid to contain some solids. As the seat face 12 and the soft seat 98 intercept the passages 86 above the valve passage 14 and as the blade 34 is held tight against the soft seat 98 along its entire periphery, it is easily understood that there is no communication between the seat side of the valve V and the bonnet 24 when the valve is closed.

Finally, it is noted that tests have been conducted with knife valves V constructed in accordance with the present specification and that such knife valves have been tested in sizes of 6 inches, 10 inches, 12 inches, 18 inches and 24 inches. The tests have proven that the present knife valve V provides a tight seal without clogging. In white water use, ball valves have been successfully used in white water operations, although such ball valves can cost up to $70,000.00 for a 24-inch valve which also weighs approximately 8,000 pounds, thereby necessitating a complex structure for mounting the same in a ceiling, or the like. Also, the spacing between the pipes required for such large size ball valves is considerable. A corresponding 24 inch knife valve in accordance with the present invention costs from $12,000.00 to $15,000.00 and does not exceed 1,000 pounds in weight. Furthermore, it is well known that standard knife valves used with white water become jammed approximatively every two weeks thereby resulting in high costs especially due to down time. The present knife valve used in white water applications in paper mills have not yet failed, and thus caused any downtime, in over a year. Therefore, tests have convincingly shown that the present knife valves are functional and economical.

I claim:

1. A wafer knife gate valve comprising a body having a valve seat, a knife blade longitudinally movable by an operating means in said body for opening and closing a lateral flow passage defined through said body, a bonnet means for completely enclosing said knife blade in said valve, said bonnet means comprising therein guide means defining a cavity with said operating means being displaceable therein, a pair of chamber means being defined in said bonnet means on each side of said operating means, said bonnet means defining at an upper portion thereof a passage means at least partly around said guide means for permitting a sufficient flow between said pair of chamber means when said valve is at least partly open, whereby a substance flowing through said valve and into said bonnet means can sufficiently circulate between said pair of chamber means by way of said passage means thereby preventing solids contained in the substance from accumulating in said bonnet means and hampering the operation of the valve, wherein, in a closed position of said valve, said knife blade is seated against said valve seat for isolating the flow passage of a seat side of said valve from said bonnet means and the flow passage on a seatless side of said valve.

2. A knife valve as defined in claim 1, wherein said operating means and said guide means prevent any substantial flow between said pair of chamber means at a location in said bonnet means lower than said passage means.

3. A knife valve as defined in claim 2, wherein said operating means comprises a cylindrical stem extending through said bonnet means, annular sealing means being provided in said bonnet means around said stem to prevent said valve from leaking.

4. A knife valve as defined in claim 2, wherein said guide means comprises a pair of elongated members of arcuate cross-section and facing each other in a spaced apart relationship thereby defining a pair of blade passages joining said chamber means and said cavity, said passage means being of substantially annular cross-section and being disposed concentrically around said elongated members.

5. A knife valve as defined in claim 4, wherein said valve seat is located on a first side of said knife blade and in an operative proximity thereto, means being provided for transferring a longitudinal force exerted by said operating means on said knife blade when said knife blade is in a closed position thereof at least partially into a lateral force oriented towards said first side, whereby said knife blade is forced against said valve seat in a tight bidirectional seal.

6. A knife valve as defined in claim 5, wherein said operating means and said knife blade are slidably engaged one to the other and include a first set of coacting angular surfaces oriented for transferring said longitudinal force into said lateral force.

7. A knife valve as defined in claim 6, wherein at least one lug is provided on a lower portion of said body on a second side of said knife blade, a lower portion of said knife blade and said lug defining a second set of coacting angular surfaces adapted to urge said knife blade against said valve seat when said knife blade is in said closed position.

8. A knife valve as defined in claim 7, wherein said operating means has a blade connecting member at a lower end thereof, said blade connecting member including a neck portion and a head portion extending horizontally at a lower end of said neck portion towards said first side of said knife blade and engaging a slot defined in said knife blade, said head portion and said slot defining said first set of coacting surfaces, said neck portion being positioned on said second side and between said knife blade and said body, whereby said knife blade in said closed position is sandwiched between said valve seat on said first side and said blade connecting member and said lug on said second side.

9. A knife valve as defined in claim 5, wherein said valve seat comprises a resilient seat including an annular ring mounted to said body and including a pair of resilient annular seals for providing seals between said knife blade and said ring and between said ring and said body.

10. A knife valve as defined in claim 9, wherein said resilient seals are torus-shaped.

11. A knife valve as defined in claim 2, wherein a blade passage defined in said body comprises enlarged channel means in communication with said chamber means.

12. A knife valve comprising a body having a valve seat, a knife blade longitudinally movable by a displaceable operating means in said body for opening and closing a lateral flow passage defined through said body, a bonnet means for completely enclosing said knife blade in said valve, said bonnet means comprising therein guide means for said operating means, said valve seat being located on a first side of said knife blade and in operative proximity thereto, said operating means and said knife blade being slidably engaged one to the other and including thereat a first pair of coacting angular surfaces, a pair of lug means being provided on said body on a second side of said knife blade, said knife blade and said pair of lug means defining second and third pairs of coacting angular surfaces, said first, second and third pairs of coacting angular surfaces being adapted for transferring a longitudinal force exerted by said operating means on said knife blade when said knife blade is in a closed position thereof at least partly into lateral forces oriented towards said valve seat and acting on peripheral regions of said knife blade, whereby said knife blade is forced against said valve seat in a tight bidirectional seal.

13. A knife valve as defined in claim 12, wherein said pair of lug means are located symmetrically opposite a lower half of said knife blade when said knife blade is in said closed position, whereby said first, second and third pairs of coacting angular surfaces are disposed as an isosceles triangular thereby distributing the force applied on said knife blade towards said valve seat.

14. A knife valve as defined in claim 2, wherein said guide means define a cavity with said operating means being displaceable therein, a pair of chamber means being defined in said bonnet means on each side of said operating means, said bonnet means defining at an upper portion thereof a passage means at least partly around said guide means for permitting a sufficient flow between said pair of chamber means when said valve is at least partly open, whereby a substance flowing through said valve and into said bonnet means can sufficiently circulate between said pair of chamber means by way of said passage means thereby preventing solids contained in the substance from accumulating in said bonnet means and hampering the operation of the valve, wherein in a closed position of said valve, said knife blade is seated against said valve seat for isolating the flow passage of a seat side of said valve from said bonnet means and the flow passage on a seat-less side of said valve.

15. A knife valve as defined in claim 14, wherein said guide means comprises a pair of elongated members of arcuate cross-section and facing each other in a spaced apart relationship thereby defining a pair of blade passages joining said chamber means and said cavity, said passage means being of substantially annular cross-section and being disposed concentrically around said elongated members.

16. A knife valve as defined in claim 12, wherein said operating means comprises a cylindrical stem having a blade connecting member at a lower end thereof, said blade connecting member including a neck portion and a head portion extending horizontally at a lower end of said neck portion towards said first side of said knife blade and engaging a slot defined in said knife blade, said head portion and said slot defining said first set of coacting surfaces, said neck portion being positioned on said second side and between said knife blade and said body, whereby said knife blade in said closed position is sandwiched between said valve seat on said first side and said blade connecting member and said pair of lug means on said second side.

17. A knife valve as defined in claim 12, wherein said operating means comprises a cylindrical stem extending through said bonnet means, annular sealing means being provided in said bonnet means around said stem to prevent said valve from leaking.

18. A knife valve as defined in claim 12, wherein said valve seat comprises a resilient seat including an annular ring mounted to said body and including a pair of resilient annular seals for providing seals between said knife blade and said ring and between said ring and said body.

19. A knife valve as defined in claim 18, wherein said resilient seals are torus-shaped.

* * * * *